United States Patent
Douhet et al.

[19]

[11] Patent Number: 6,067,352
[45] Date of Patent: May 23, 2000

[54] PRINTER-OPTION SYSTEM FOR EXCHANGING DATA BETWEEN A TERMINAL AND ACCESS MEANS VIA A TELEPHONE NETWORK, AND ACCESS MEANS, AND TERMINAL

[75] Inventors: Gérard Douhet, Fegersheim; Jean-Yves Dumaine, Strasbourg, both of France

[73] Assignee: Alcatel, Paris, France

[21] Appl. No.: 09/161,110

[22] Filed: Sep. 25, 1998

[30] Foreign Application Priority Data

Sep. 25, 1997 [EP] European Pat. Off. ............ 97 440 088

[51] Int. Cl.⁷ .................................................. H04M 11/00
[52] U.S. Cl. .................................... 379/93.25; 379/93.01; 395/114
[58] Field of Search .............................. 379/93.24–93.28, 379/93.01, 93.08, 93.09, 100.08–100.15; 395/109, 114

[56] References Cited

U.S. PATENT DOCUMENTS

| | | |
|---|---|---|
| 4,713,780 | 12/1987 | Schultz et al. . |
| 4,837,798 | 6/1989 | Cohen et al. . |
| 5,548,789 | 8/1996 | Nakanura . |
| 5,867,633 | 2/1999 | Taylor, III et al. ..................... 395/109 |

FOREIGN PATENT DOCUMENTS

| | | |
|---|---|---|
| 0739115 | 10/1996 | European Pat. Off. . |
| 0782304 | 7/1997 | European Pat. Off. . |
| 2737797 | 7/1995 | France . |
| 3234081 | 3/1984 | Germany . |
| 9406230 | 3/1994 | WIPO . |
| 9520793 | 8/1995 | WIPO . |
| 9522865 | 8/1995 | WIPO . |
| 9620553 | 7/1996 | WIPO . |
| 9708906 | 3/1997 | WIPO . |
| 9733413 | 9/1997 | WIPO . |

OTHER PUBLICATIONS

"Electronic Mail mit Pager" in Foroschung & Entwicklung, Feb. 2, 1996, No. 4 pp. 72–73.
"Accessing Messages Your Way" by Miller et al, AT&T Technology (1995) No. 1, New York, pp. 6–9.
Patent Abstracts of Japan, No. 04178058, Meidensha Corp., Jun. 25, 1992.
Patent Abstracts of Japan, No. 08097852, N T T Data Tsushin KK, Apr. 12, 1996.
"AT&T Mail Public Messaging Service". by DeFelica et al, AT & T Technology, vol. 4, n0 2, Jan. 1989, pp. 18–24.

*Primary Examiner*—Wing F. Chan
*Attorney, Agent, or Firm*—Ware, Fressola, Van Der Sluys & Adolphson LLP

[57] ABSTRACT

Terminals having analog/digital telephone functions as well as data exchange functions and having a printer-option and for use in a system comprising an access provider/server provider and such a terminal should have a low complexity, which can be realized by locating conversion device for converting data into printer data at the access provider/server provider and by locating switching device for switching the printer data arriving via the telephone network to a printer connector at the terminal. Then, although the hardware printer driver is still in the terminal, the software printer driver is installed at the access provider/server provider, which reduces the complexity and load of the terminal.

18 Claims, 3 Drawing Sheets

PRINTER-OPTION SYSTEM FOR EXCHANGING DATA BETWEEN A TERMINAL AND ACCESS MEANS VIA A TELEPHONE NETWORK, AND ACCESS MEANS, AND TERMINAL

CROSS-REFERENCE TO RELATED APPLICATIONS

This patent application discloses subject matter that is disclosed and may be claimed in copending U.S. Patent applications.

TECHNICAL FIELD

The invention relates to a system for exchanging data between a terminal and access means via a telephone network, which terminal comprises a line-interface to be coupled to said telephone network, a processor coupled to said line-interface, a terminal-memory coupled to said processor, and a printer-connector coupled to said line-interface and to be coupled to a printer, which access means comprise at least one access point to be coupled to said telephone network, and at least one server to be coupled to said access point via a data connection,

BACKGROUND OF THE INVENTION

Such a system, with said terminal for example being a personal computer, with said access means for example being formed by an access provider and a service provider, and with said telephone network being for example an analog or an ISDN network, is of common general knowledge. Said line-interface comprises for example a modem card or an ISDN board, and said terminal-memory comprises for example a hard disk drive and/or a floppy disk drive. Because of hard disks and floppy disks nowadays having a large capacity, the software for driving the printer (the so-called printer driver which converts ordinary data into printer data suitable for the printer) is usually installed on one of said disks.

This system is disadvantageous, inter alia, because of said software occupying said terminal too much.

SUMMARY OF THE INVENTION

It is an object of the invention, inter alia, to provide a system as defined in the preamble, according to which said printer is less occupied by said software.

Thereto, the system according to the invention is characterised in that the access means comprise conversion means for converting data into printer data, with the terminal comprising switching means for switching said printer data arriving via the telephone network to said printer connector.

By locating said conversion means in the access means, or, in other words, installing the printer driver for example in a server-memory, and by introducing said switching means in the terminal for, preferably transparently, switching said printer data from the telephone network to the printer connector, the access means take care of controlling the printing of data.

The invention is based on the insight, inter alia, that when of two processors which are mutually coupled to a network, one of them is too busy, or does not have sufficient memory capacity, functions of this one can be shifted to the other one.

The invention solves the problem, inter alia, of reducing the functions of the terminal and allowing said terminal to have a smaller memory, which then could be completely non-mechanical, by placing the printer driver in the server.

A first embodiment of the system according to the invention is characterised in that said terminal comprises generation means for generating an order code for transmission to said access means and defining which data is to be converted into printer data.

By transmitting said order code, a user of said terminal can indicate for example which part of his display is to be printed.

A second embodiment of the system according to the invention is characterised in that said access means comprise further generation means for generating a printer code defining an address of said printer.

By generating said printer code, for example in response to said order code and/or in response to a user identification etc., the access means can indicate to which printer and via which terminal the printer data should be sent. As a consequence of this, the printing function can become more isolated from other communications between terminal and access means.

The invention further relates to access means for exchanging data with a terminal via a telephone network, which terminal comprises a line-interface to be coupled to said telephone network, a processor coupled to said line-interface, a terminal-memory coupled to said processor, and a printer-connector coupled to said line-interface and to be coupled to a printer, which access means comprise at least one access point to be coupled to said telephone network, and at least one server to be coupled to said access point via a data connection.

The access means according to the invention are characterised in that the access means comprise conversion means for converting data into printer data.

A first embodiment of the access means according to the invention is characterised in that said access means comprise further generation means for generating a printer code defining an address of said printer.

The invention yet further relates to a terminal for exchanging data with access means via a telephone network, which terminal comprises a line-interface to be coupled to said telephone network, a processor coupled to said line-interface, a terminal-memory coupled to said processor, and a printer-connector coupled to said line-interface and to be coupled to a printer, which access means comprise at least one access point to be coupled to said telephone network, and at least one server to be coupled to said access point via a data connection.

The terminal according to the invention is characterised in that the terminal comprises switching means for switching printer data arriving via the telephone network and originating from said server to said printer connector, which server has converted data into said printer data.

A first embodiment of the terminal according to the invention is characterised in that said terminal comprises generation means for generating an order code for transmission to said access means and defining which data is to be converted into printer data.

All references including further references cited with respect to and/or inside said references are considered to be incorporated in this patent application.

BRIEF DESCRIPTION OF THE DRAWINGS

The invention will be explained in greater detail at the hand of embodiments disclosed in the drawings, whereby FIG. 1 discloses a system according to the invention comprising a terminal according to the invention and access means according to the invention, FIG. 2 discloses a terminal according to the invention for exchanging data with access means, and FIG. 3 discloses access means according to the invention for exchanging data with a terminal.

BEST MODE FOR CARRYING OUT THE INVENTION

Figure 1:
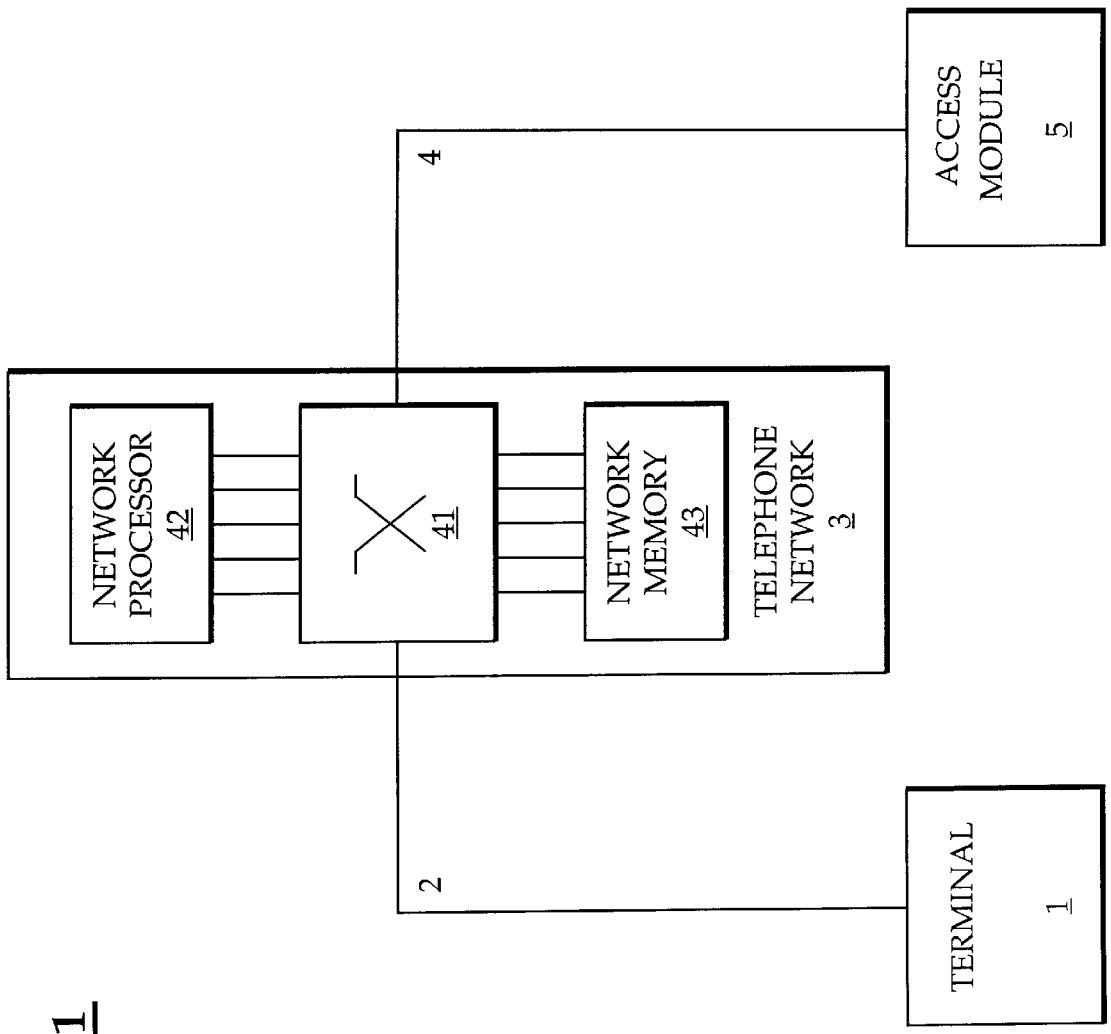

The system according to the invention as disclosed in FIG. 1 comprises a terminal 1 according to the invention coupled via a telephone line 2 to a telephone network 3 and comprises access means 5 according to the invention coupled via a telephone line 4 to said telephone network 3. Said telephone network 3 comprises a switch 41 controlled by a network-processor 42 and coupled to a network-memory 43.

Figure 2:
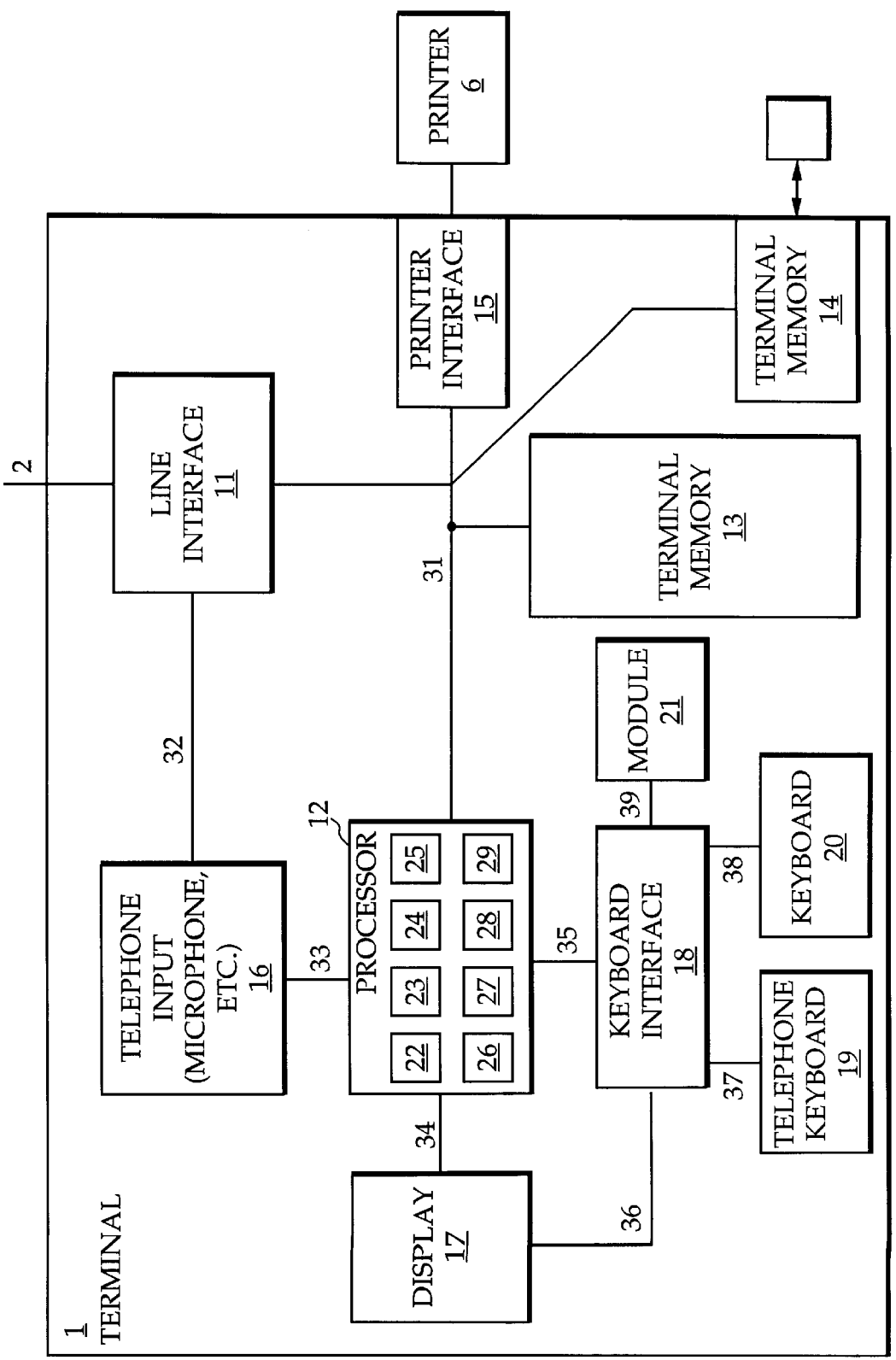

The terminal 1 according to the invention as disclosed in FIG. 2 comprises a line-interface 11 coupled to said telephone line 2 and coupled via a bus 31 to a processor 12 and to terminal-memories 13 and 14 and to a printer-interface 15 and coupled via a connection 32 to telephone means 16 (microphone, speaker, etc.). Processor 12 is further coupled via a connection 33 to telephone means 16 and via a connection 34 to a display 17 and via a connection 35 to a keyboard-interface 18, which via a connection 36 is coupled to display 17 and via a connection 37 to a telephone-keyboard 19 and via a connection 38 to an alphanumeric-keyboard 20 and via a connection 39 to a module 21. Printer-interface 15 is coupled via a connection 7 to a printer 6.

Figure 3:
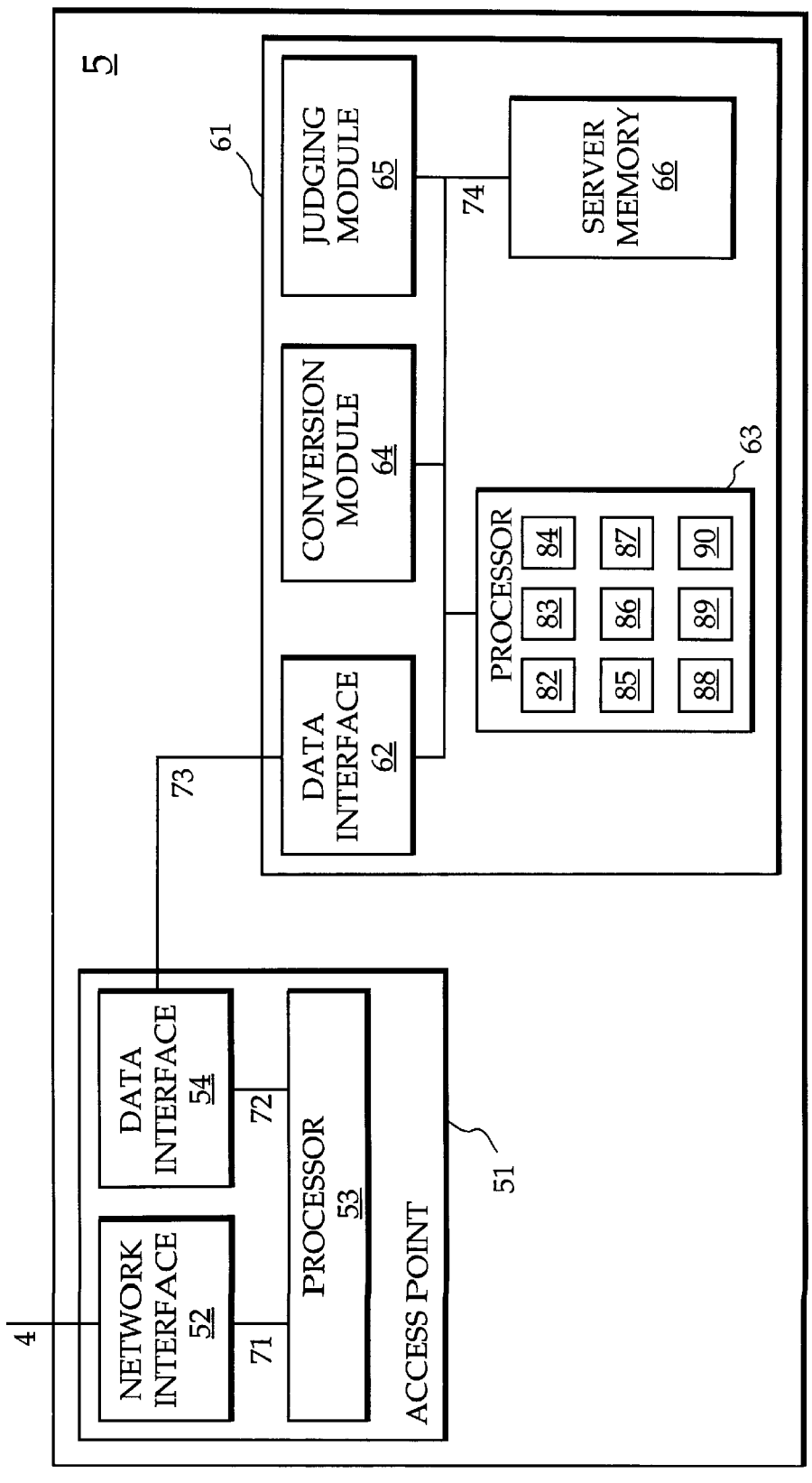

Access means 5 as disclosed in FIG. 3 comprise an access point 51 being provided with a network-interface 52 coupled via telephone line 4 to telephone network 3 and with a processor 53 coupled via connection 71 to network-interface 52 and via connection 72 to a data-interface 54, which is coupled to a data-connection 73. Access means 5 further comprise a server 61 being provided with a data-interface 62 coupled to data-connection 73 and via a bus 74 to a processor 63 and to conversion means 64 and to judging means 65 and to a server-memory 66.

The system disclosed in FIG. 1 comprising the terminal 1 disclosed in FIG. 2 and the access means 5 disclosed in FIG. 3 functions as follows.

Generally before it can be used for all purposes terminal 1 will have to be provided with installation-data. This can be done according to at least three possibilities.

According to a first possibility, the user dials a predefined telephone number via telephone-keyboard 19, which telephone number is transmitted via connection 37, keyboard-interface 18, connection 35, processor 12, bus 31, line-interface 11 and telephone line 2 to telephone network 3 as Dual Tone Multi Frequency (DTMF) signals in case of terminal 1 being an analog terminal and as digital signals in case terminal 1 being an Integrated Service Digital Network (ISDN) terminal (whereby a mixture of both kind of signals should not be excluded, like for example the possibility of post dialing in DTMF on an ISDN terminal). In response to this, telephone network 3 connects telephone line 2 to telephone line 4 under control of network-processor 42, and in access point 51 telephone line 4 is coupled via network-interface 52 and processor 53 and data 5 interface 54 to data-connection 73, which in server 61 is coupled via data-interface 62 and bus 74 to server-memory 66, which under control of processor 63 sends installation-data to terminal 1 (automatically or in response to a installation-command originating from terminal 1). This installation-data comprises for example at least one access code defining an address of an access point and at least one server code defining an address of a server address and software and/or commands. This installation-data is stored into terminal-memory 13 or terminal-memory 14 or spread over both terminal-memories 13 and 14. As an alternative it is also possible that telephone line 2 is connected to other access means comprising at least either an other access point not shown in the figures or an other server not shown in the figures, or that telephone line 2 is only connected to network-memory 43 for the receival of said installation-data.

According to a second possibility, at least some of said installation-data is not transmitted from server 61 to terminal 1, but is supplied to terminal 1 by the user via the use of alphanumeric-keyboard 20.

According to a third possibility, at least some of said installation-data is neither transmitted from server 61 to terminal 1 nor supplied to terminal 1 by the user via the use of alphanumeric-keyboard 20, but is supplied to terminal 1 by the user via the insertion of a (smart) card into terminal-memory 14 being a card reader.

Of course, parts of said three possibilities could be combined, whereby for example the insertion of the (smart) card could trigger and thus replace the dialling of said telephone number. Instead of loading the installation-data into terminal 1, at least some or all installation-data could already be stored in terminal-memories 13 and 14, which could have been realised during manufacturing.

In case the installation-data to be stored into or already stored in terminal 1 is user-dependent, for example due to the fact that a user should be able to choose his favorite access point and server, when using the first possibility different telephone numbers could be used, or in case of one telephone number different installation-commands could be used, and when using the third possibility the (smart) card should be individualised. Due to this, generally a selection of at least one access code and/or of at least one server code has to be made (during manufacturing or during selling by giving the user a certain (smart) card and/or certain instructions or during installation by the user), after which selected access codes and server codes should be stored into at least one of said terminal-memories 13 (ROM,RAM etc.) and 14 (card reader), which preferably are non-mechanical due to terminal 1 having a predefined size and price.

Said storage of said installation-data including for example at least one access code defining an address of an access point and at least one server code defining an address of a server address and software and/or commands in a very user friendly way allows terminal 1 also to be used by users who are of a lower skilled level than for example the average user of a personal computer. After said storage, for example only one command or even a certain key of one of said keyboards 19 and 20 could be sufficient for getting access to for example INTERNET for sending data like e-mail messages and/or taking a look at received data like e-mail messages which are stored in server-memory 66.

The use of a smart card further offers the possibility of storing a key signal and calculations means on said smart card. These calculation means calculate a response signal in response to a challenge signal and said key signal, after which said response signal is transmitted to judging means 65 inside server 61 via bus 31, line-interface 11, telephone line 2, telephone network 3, telephone line 4, access point 51, data-connection 73, data-interface 62 and bus 74. Judging means 65 judge whether or not said calculated response signal originating from the smart card is correct, for example by making the same calculation and comparing the results. The generation of said challenge signal could be realised by processor 63 comprising generation means 82, after which said challenge signal should be sent to terminal 1, or could be realised by processor 12 comprising generation means 22, after which said challenge, together with or separated from said calculated response, should be sent to server 61. Said smart card could further be provided with receiving means for receiving a pin code (personal identification number), whereby only in case said pin code is correct said calculation means are to be activated. Then the unauthorised use of a smart card and of a terminal comprising said smart card is made impossible. Generally, the use of a smart card allows the storage of personal information on the card, whereby general information is stored into the terminal, as a consequence of which only after insertion of said smart card the terminal is individualised. Of course, said receiving means for receiving a pin code could also be located inside terminal 1, and/or could be used for blocking/allowing each possible terminal function and/or each possible access to said access means 5. Said smart card could further have more functions like payment functions and/or GSM functions, and could for example be used for encrypting/decrypting certain data to be exchanged, for example by using said key signal, in which case access means 5 should be provided with an encryption/decryption device.

The system disclosed in FIG. 1 is capable of treating each user individually, which can be done in different ways.

According to a first way, a user of terminal 1 can get his own screen layout on display 17, due to the fact that access means 5 have been provided with processing means for processing data destined for terminal 1 in a user-dependent way, like for example processor 63, which comprises receiving means 83 for receiving a user-dependent code from terminal 1 and comprises a configuration memory 84 for storing configuration parameters defining said screen layout. When a user of terminal 1 has contacted access means 5 for receiving data, his identification and/or address are known to access means 5, for example because he has generated his identification and/or address via at least one of said keyboards 19 and 20, or for example because his identification and/or address are stored on said smart card and automatically (possibly after receival of a correct pin code) read out when said smart card is inserted, or for example because of the telephone number of terminal 1 being known to telephone network 3 and being automatically supplied to access means 5 in case of a connection being created. This identification and/or address are received by receiving means 83, and in response to that, configuration memory 84 is read out, resulting in configuration parameters belonging to this user being used for configuring data such that he gets his own screen layout. Instead of said identification and/or address, it is also possible to use a special code generated by the user via at least one of said keyboards 19 and 20 and/or stored on said smart card.

According to a second way, when a user of terminal 1 has contacted access means 5 for receiving data like e-mail messages, it could be interesting for said user to receive only a part of said data, like the title and the sender's address of each e-mail message, for getting an overview, and/or it could be necessary to transmit only a part of said data to terminal 1, due to terminal-memory 13 being too small for comprising the entire content of said data. This is realised by either using said identification and/or address and/or special code, at least one of them indicating that data destined for the terminal should be transmitted in parts, and possibly indicating which part is to be transmitted. For receiving a further part, either the user should generate and transmit a further code to be received by said receiving means 83, for example, or said further code is generated automatically, for example after a time-interval has expired, either in terminal 1 or in access means 5. In case the further code is generated by the user, it could be a short command, or for example a key of one of said keyboards 19 and 20.

Of course, it should not be excluded that for example said special code is stored (temporarily) in server-memory 66 for example, resulting in terminal 1 automatically receiving only a predefined part of said data.

The system disclosed in FIG. 1 can initiate actions, because of being provided with a self-triggering mechanism. This self-triggering mechanism is either in terminal 1 (pulling) or in access means 5 (pushing) located.

In case of the self-triggering mechanism 85 being located in access means 5, it for example forms part of processor 63, and functions as follows.

When there is no connection between terminal 1 and access means 5, and for example server 61 receives new information to be stored in server-memory 66, like for example a new weather forecast, then either a comparator forming part of self-triggering mechanism 85 compares a code belonging to the new information with a code belonging to terminal 1 and for example stored in server-memory 66, and in case of equality decides that terminal 1 should be informed, or a clock forming part of self-triggering mechanism 85 decides at a certain moment, possibly after consultation of said code belonging to terminal 1 and stored in server-memory 66, that terminal 1 should be informed. In both cases, an indication signal is generated by generation means 86 forming part of processor 63, which generation signal comprises for example an address or telephone number of terminal 1. This indication signal is supplied to telephone network 3 via bus 74, data-interface 62, data-connection 73, access point 51 and telephone line 4. Telephone network 3 then transmits this indication signal to terminal 1, in case of terminal 1 being an analog terminal via calling line identification (after a first ringing signal of a telephone call, but before a possible second ringing signal), and in case of terminal 1 being an ISDN terminal via the D-channel. Terminal 1 comprises receiving means 23 forming part of processor 12, which receiving means 23 receive (a part of) said indication signal via telephone line 2, line-interface 11 and bus 31, after which said indication signal is displayed via display 17, thereby informing the user of the arrival in the server of new information. Of course, terminal 1 could further be provided with an automatic-connection mechanism which, in response to the receival of said indication signal, automatically makes a data connection for receiving said new information, which is then stored into terminal-memory 13.

When there is a connection between terminal 1 and access means 5, for example via generation means 24 which form part of processor 12, terminal 1 sends an update code to access means 5, whereby in server 61 a comparator forming part of self-triggering mechanism 85 compares this update code with codes stored in server-memory 66, and for example in case of inequality server 61 decides that terminal 1 should get an update of software, or in server 61 a clock forming part of self-triggering mechanism 85 decides at a certain moment, possibly after consultation of said update code belonging to terminal 1, that terminal 1 should get an update of software. In both cases, the update of software as for example stored in server-memory 66 is transmitted to terminal 1, for example together with an update signal informing terminal 1 what to do with said update (for example to inform which old part is to be replaced).

In case of the self-triggering mechanism 25 being located in terminal 1, it for example forms part of processor 12, and functions as follows.

When there is a connection between terminal 1 and access means 5, for example via generation means 87 which form part of processor 63, server 61 sends an update code to terminal 1, whereby in terminal 1 a comparator forming part of self-triggering mechanism 25 compares this update code with codes stored in terminal-memory 13, and for example in case of inequality terminal 1 decides that it should get an update of software, or in terminal 1 a clock forming part of self-triggering mechanism 25 decides at a certain moment, possibly after consultation of said update code originating from server 61, that terminal 1 should get an update of software. In both cases, the update of software as for example stored in server-memory 66 is transmitted to terminal 1, for example together with an update signal informing terminal 1 what to do with said update (for example to inform which old part is to be replaced).

When there is no connection between terminal 1 and access means 5, for example said automatic-connection mechanism could be used for, for example under control of said self-triggering mechanism 25, automatically makes a data connection for receiving said new information etc.

According to a very advantageous embodiment a first self-triggering mechanism (in the form of hardware and/or software) is located somewhere inside access means 5, which first self-triggering mechanism results in the transmitting of software to terminal 1, which software after being stored inside terminal 1 will function as a second self-triggering mechanism by investigating for example all software stored inside terminal 1 and deciding which software is to be replaced and then taking care of said replacement.

With the system disclosed in FIG. 1 the user at terminal 1 can get an overview of all messages of different types waiting for him, like telephone messages, fax messages and data messages. To realise this, there is a coupling between for example network-memory 43 and server-memory 66, which coupling is made either via telephone line 4, access point 51, data connection 73, data-interface 62 and bus 74, or via a separate connection not shown in the figures. In case the overview should be present in server-memory 66, network-memory 43 must send information to server 61, and in case the overview should be present in network-memory 43, server-memory 66 must send information to telephone network 3. In both cases the sending of said information could be done by using self-triggering mechanisms and/or automatic-connection mechanisms as described before.

When for example terminal-memory 13 comprises a server code defining an address of server 61 (and possibly an access code defining an address of access point 51), and comprises for example an overview code defining that an overview of all messages is required, a user of terminal 1 may get this overview in a very user friendly way, by for example pressing only one key or typing a short command via at least one of both keyboards 19 and 20, after which terminal 1 is connected with server 61, and server-memory 66 transmits said overview to terminal 1 for, for example, displaying this overview via display 17.

Instead of said user taking initiative, it is also possible that, in case for example server 61 receives new information to be stored in server-memory 66, like for example information with respect to telephone/fax messages stored in network-memory 43, or like for example data messages to be stored in server-memory 66, then either a comparator forming part of self-triggering mechanism 85 compares a first and second code belonging to the new information with a first and second code belonging to terminal 1 and for example stored in server-memory 66 (which first code for example indicates that the new information is destined for terminal 1, and which second code for example indicates that terminal 1 has already or not yet been informed with respect to the new information), and in case of respective equality and inequality decides that terminal 1 should be informed, or a clock forming part of self-triggering mechanism 85 decides at a certain moment, possibly after consultation of said codes belonging to terminal 1 and stored in server-memory 66, that terminal 1 should be informed. In both cases, an indication signal is generated by generation means 86 forming part of processor 63, which generation signal comprises for example an address or telephone number of terminal 1 (a terminal code). This indication signal is supplied to telephone network 3 via bus 74, data-interface 62, data-connection 73, access point 51 and telephone line 4. Telephone network 3 then transmits this indication signal to terminal 1, in case of terminal 1 being an analog terminal via calling line identification (after a first ringing signal of a telephone call, but before a possible second ringing signal), and in case of terminal 1 being an ISDN terminal via the D-channel. Terminal 1 comprises receiving means 23 forming part of processor 12, which receiving means 23 receive (a part of) said indication signal via telephone line 2, line-interface 11 and bus 31, after which said indication signal is displayed via display 17, thereby informing the user of the arrival in the server of new information. Of course, terminal 1 could further be provided with an automatic-connection mechanism which, in response to the receival of said indication signal, automatically makes a data connection for receiving said new information, which is then stored into terminal-memory 13.

The system disclosed in FIG. 1 is further capable of dealing with terminal 1 being connected to a printer 6 via a connection 7. Thereto, for example processor 63 in server 61 is for example provided with conversion means 64 for converting data to be printed into printer data, with receiving means 88 for receiving an order code originating from terminal 1 and indicating which data is to be converted, and with generation means 89 for generating a printer code defining an address of said printer 6. In terminal 1, processor 12 is for example provided with generation means 26 for generating said order code destined for server 61, and with receiving means 27 for receiving said printer code originating from server 61. Usually, a user using terminal 1 will decide when data has to be printed. Compared to a personal computer, which has sufficiently memory capacity and therefore is capable of converting data to be printed into printer data by using a software printer driver, terminal 1 has a predefined size and price, and therefore less memory capacity. To prevent that such a software printer driver would occupy terminal 1 too much, conversion means 64, which for example comprise such a software driver, are located in server 61. The user orders terminal 1 via at least one of said keyboards 19 and 20, to print certain data, resulting in generation means 26 generating said order code, which via bus 31, line-interface 11, telephone line 2, network 3, telephone line 4, access point 51, data connection 73, data-interface 62 and bus 74 is sent to processor 63, in which receiving means 88 receive said order code and control server-memory 66 and conversion means 64 in such a way that said certain data is converted into printer data. Said printer data is then sent back to terminal 1 via bus 74, data-interface 62, data connection 73, access point 51, telephone line 4, network 3 and telephone line 2. In terminal 1 said printer data is transmitted from line-interface 11 via bus 31 to printer-interface 15, and then supplied via connection 7 to printer 6. So, printer-interface does not have to comprise said software printer driver, but will generally comprise only a hardware printer driver.

In terminal 1, line-interface 11, bus 31 and printer-interface 15 together form switching means for switching said printer data without passing processor 12.

For example said printer code to be generated by generation means 89 and for example to be sent from server 61 to terminal 1 (just) before said printer data is sent, could be used to inform processor 12 of the need for a transparent mode on behalf of said printer data. Said order code generally could comprise the identity and/or address and/or type and/or trademark of said printer 6, to prevent that for example server 61 is overloaded with information.

Said access point 51 can of course entirely or partially be integrated with at least telephone network 3 and/or server 61. Further, inside terminal 1, inside access point 51 and inside server 61, parts could be entirely or partially integrated.

Further, all embodiments and/or possibilities described above could of course be combined into new embodiments and/or possibilities having further inventive concepts.

What is claimed is:

1. A system for exchanging data between a terminal and access means via a telephone network, which terminal comprises
    a line-interface to be coupled to said telephone network,
    a processor coupled to said line-interface,
    a terminal-memory coupled to said processor, and
    a printer-connector coupled to said line-interface and to be coupled to a printer, which access means comprise
    at least one access point to be coupled to said telephone network, and
    at least one server to be coupled to said access point via a data connection, characterised in that the access means comprise
    conversion means for converting data into printer data, and the server comprises a software printer driver so as to relieve the terminal from having a software printer driver; with the terminal comprising
    switching means for switching said printer data arriving via the telephone network to said printer connector.

2. A system according to claim 1, characterised in that said terminal comprises generation means for generating an order code for transmission to said access means and defining which data is to be converted into printer data.

3. A system according to claim 2, characterised in that said access means comprise further generation means for generating a printer code defining an address of said printer.

4. An access means for exchanging data with a terminal via a telephone network, which terminal comprises
    a line-interface to be coupled to said telephone network,
    a processor coupled to said line-interface,
    a terminal-memory coupled to said processor, and
    a printer-connector coupled to said line-interface and to be coupled to a printer, which access means comprise
    at least one access point to be coupled to said telephone network, and
    at least one server to be coupled to said access point via a data connection, characterised in that the access means comprise
    conversion means for converting data into printer data and the server comprises a software printer driver so as to relieve the terminal from having a software printer driver.

5. An access means according to claim 4, characterised in that said access means comprise further generation means for generating a printer code defining an address of said printer.

6. A terminal for exchanging data with access means via a telephone network, which terminal comprises
    a line-interface to be coupled to said telephone network,
    a processor coupled to said line-interface,
    a terminal-memory coupled to said processor, and
    a printer-connector coupled to said line-interface and to be coupled to a printer, which access means comprise
    at least one access point to be coupled to said telephone network, and
    at least one server to be coupled to said access point via a data connection, characterised in that the server comprises a software printer driver so as to relieve the terminal from having a software printer driver and the terminal comprises
    switching means for switching printer data arriving via the telephone network and originating from said server to said printer connector, which server has converted data into said printer data.

7. A terminal according to claim 6 characterised in that said terminal comprises generation means for generating an order code for transmission to said access means and defining which data is to be converted into printer data.

8. A system according to claim 1 characterised in that said access means comprise further generation means for generating a printer code defining an address of said printer.

9. A system for exchanging data between a terminal and access means via a telecommunication network, wherein said terminal comprises
    a line-interface to be coupled to said telecommunication network,
    a processor coupled to said line-interface,
    a printer-interface coupled to said line-interface, and
    a printer-connector coupled to said printer-interface and a printer, wherein said access means comprise
    at least one access point coupled to said telecommunication network, and
    at least one server coupled to said access point via a data connection, and wherein said system comprises a printer driver for driving said printer, and said printer driver comprises at least a software printer driver and a hardware printer driver, characterised in that said hardware printer driver is substantially a part of said printer-interface, and said software printer driver is substantially a part of said access means.

10. A system according to claim 9, characterised in that said software printer driver is substantially a part of said server, wherein said software printer driver converts data into printer data, with the terminal comprising switching means for switching said printer data arriving via the telecommunication network to said printer-interface in a substantially transparent way.

11. A system according to claim 9, characterised in that said terminal comprises generation means for generating an order code for transmission to said access means and defining which data is to be converted into printer data.

12. A system according to claim 11, characterised in that said access means further comprise generation means for generating a printer code defining an address of said printer.

13. An access means for exchanging data with a terminal via a telecommunication network, wherein said terminal comprises a line-interface to be coupled to said telecommunication network, a processor coupled to said line-interface, a printer-interface coupled to said line-interface, and a printer-connection coupled to said printer-interface and a printer driven by a printer driver, wherein said access means comprise at least one access point to be coupled to said telecommunication network, and at least one server to be coupled to said access point via a data connection, characterised in that said printer driver comprises at least a software printer driver and a hardware printer driver, and said software printer driver is substantially a part of said access means, with said hardware printer driver being substantially a part of said printer-interface.

14. An access means according to claim 13, characterised in that said software printer driver is substantially a part of said server and converts data into printer data, with the terminal comprising switching means for switching said printer data arriving via the telecommunication network to said printer-interface in a substantially transparent way.

15. An access means according to claim 13, characterised in that said access means further comprise generation means for generating a printer code defining an address of said printer.

16. A terminal for exchanging data with access means via a telecommunication network, wherein said terminal comprises a line-interface to be coupled to said telecommunication network, a processor coupled to said line-interface, a printer-interface coupled to said line interface, and printer-connector coupled to said printer-interface and a printer driven by a printer driver, and wherein said access means comprise at least one access point to be coupled to said telecommunication network, and at least one server to be coupled to said access point via a data connection, characterised in that said printer driver comprises at least a software printer driver and a hardware printer driver, and said hardware printer driver is substantially a part of said printer-interface, with said software printer driver being substantially a part of said access means.

17. A terminal according to claim 16, characterised in that said software printer driver is substantially a part of said server and converts data into printer data, with the terminal comprising switching means for switching said printer data arriving via the telecommunication network to said printer-interface in a substantially transparent way.

18. A terminal according to claim 16, characterised in that said terminal comprises generation means for generating an order code for transmission to said access means and defining which data is to be converted into printer data.

* * * * *